United States Patent [19]

Miller

[11] 4,380,718

[45] Apr. 19, 1983

[54] TRAILER MARKER LIGHT SUBSTITUTION CIRCUIT

[75] Inventor: Roger L. Miller, Ann Arbor, Mich.

[73] Assignee: Kelsey-Hayes Co., Romulus, Mich.

[21] Appl. No.: 267,218

[22] Filed: May 22, 1981

[51] Int. Cl.³ .......................... H05B 39/10; B60Q 1/26
[52] U.S. Cl. ................................ 315/93; 307/10 LS; 315/135; 315/77; 340/642
[58] Field of Search ...................... 315/67, 88, 92, 93, 315/120, 129, 135, 136, 201, 205, 77; 307/10 LS, 38, 39; 362/20, 80; 340/641, 642

[56] References Cited

U.S. PATENT DOCUMENTS 3,659,146  4/1972  Munson ................................. 315/92
3,883,777  5/1975  Morita ............................... 315/93 X
4,128,860  12/1978  Spiteri ................................. 362/80
4,216,525  8/1980  Spiteri ............................. 340/642 X

*Primary Examiner*—Eugene R. La Roche
*Attorney, Agent, or Firm*—Ralph J. Skinkiss; Oliver E. Todd

[57] ABSTRACT

An improved dual polarity substitution circuit for energizing a secondary load, such as an incandescent lamp, upon failure of a primary load. Dual polarity is achieved through the use of parallel PNP and NPN transistors, one of which conducts so long as the primary load is functional. Upon failure of the primary load and interruption of current flow in the conducting one of the transistors, a bidirectional switch such as a triac is fired to energize the secondary load.

7 Claims, 2 Drawing Figures

TRAILER MARKER LIGHT SUBSTITUTION CIRCUIT

BACKGROUND OF THE INVENTION

This invention relates to load substitution circuits and more particularly to an improved dual polarity circuit for energizing a reserve lamp in the event of a failure of a primary lamp located, for example, in a vehicle.

Incandescent lamps are commonly used for safety lighting on vehicles. For example, incandescent lamps are used as tail lights and brake lights on automobiles, trucks and trailers and incandescent lamps are used as marker lamps to outline the upper edges of semitrailers. When an incandescent is new, the filament, which is typically formed from tungsten, is ductile and is not affected by vibration. As the lamp is used, the filament becomes brittle and may break when subjected to vibration. In many vehicle applications, for example, lights used on trucks and semitrailers, tungsten filament incandescent lamps have a very limited lift expectancy due to vibrations caused by stiff vehicle suspension systems.

Laws require that semitrailers have marker lights spaced around the periphery of the trailer body. Laws often provide for stiff fines if a driver operates a semitrailer at night with burnt out marker lights. Consequently, it is often necessary for a truck driver to stop at night and call a service station to replace burnt out marker lights. This is extremely expensive both in paying for a service call to have the lamp replaced and also in lost time while the truck is stopped for maintenance on the lamps.

It has been suggested, for example, in U.S. Pat. Nos. 4,128,860 and 4,216,525 that a reserve or standby lamp may be provided in each marker light fixture. When a primary lamp fails, a transistor circuit automatically switches from the primary lamp to the standby lamp. Since the standby lamp has not been operated up to this point, the filament will be ductile and will not have been subceptable to vibration and induced failure. These patents also suggest that the standby lamp may be either a separate lamp or a second filament combined with the primary filament in a single dual filament bulb. These patents also suggest that a four diode bridge rectifier may be provided so that the circuit may operate on dual polarity.

SUMMARY OF THE INVENTION

According to the present invention, an improved circuit is provided for detecting a failure of a primary lamp and, upon detecting such failure, for energizing a standby or secondary lamp. The circuit is particularly suitable for use with marker lights used to outline the body of a semitrailer and with tail lights and brake lights used on all types of vehicles. The circuit also may be adapted for other types of loads for turning on a lamp or an alarm or some other type of load in response to the failure of a primary load.

The circuit includes an NPN transistor and a PNP transistor having collectors connected in common, bases collected in common and emitters collected in common. The common emitters are connected to one of two power terminals and the common bases are connected through the primary load or incandescent lamp to the other power terminal. The power terminals are connected to a vehicle power source, such as a 12 volt storage battery. Depending upon the polarity of the voltage applied to the power terminals, current will flow through the lamp and the base to emitter junctions of one of the two parallel transistors. One of the main terminals of a triac is connected to the first power terminal and the other main terminal of the triac is connected through the standby lamp or load to the second power terminal. The gate electrode of the triac is connected to the common collectors of the two transistors and also is connected through a bias resistor either directly to the second power terminal or to the common junction between the standby lamp and the triac. As long as the primary lamp is operating and current flows through the base to emitter junctions of one of the two transistors, current also will flow through the bias resistor and the collector to emitter junctions of the same transistor. Consequently, the gate of the triac is maintained at approximately the same voltage as the first power terminal and the triac does not conduct. In the event that the primary lamp or load fails, the base to emitter current in the operating one of the two transistors ceases to in turn cause an interruption in the collector to emitter current in the same transistor. Consequently, the gate of the triac is connected through the bias resistor to the secod power terminal and this increase in voltage triggers the triac to connect the standby lamp across the two power terminals. The standby lamp will continue to operate until the primary lamp is replaced. By providing the two parallel PNP and NPN transistors and using a triac or similar bidirectional switch for controlling power to the standby load, the circuit is capable of operating with either polarity power without the need for a bridge rectifier circuit.

When an incandescent lamp fails, vibrations may cause the broken ends of the lamp filament to intermittently contact, thus, causing the lamp to intermittently blink. This will cause intermittent interruptions to power on the gate terminal of the triac. However, once triggered a triac will continue to conduct until current through the main terminals is interrupted. Therefore the standby lamp will continue to operate without blinking even though the primary lamp may intermittently blink after failure. This is an improvement over prior art lamp substitutions circuits in which intermittent operation of the primary lamp after initial failure causes the secondary lamp to intermittently blink.

Accordingly, it is an object of the invention to provide an improved circuit for substituting a secondary lamp or lamp filament for a primary lamp when the primary lamp fails.

Another object of the invention is to provide an improved circuit for energizing a substitute load in the event of a failure of a primary load.

Other objects and advantages of the invention will become apparent from the following detailed description, with reference being made to the accompanying drawings.

DESCRIPTION OF THE PREFERRED EMBODIMENTS

Figure 1:
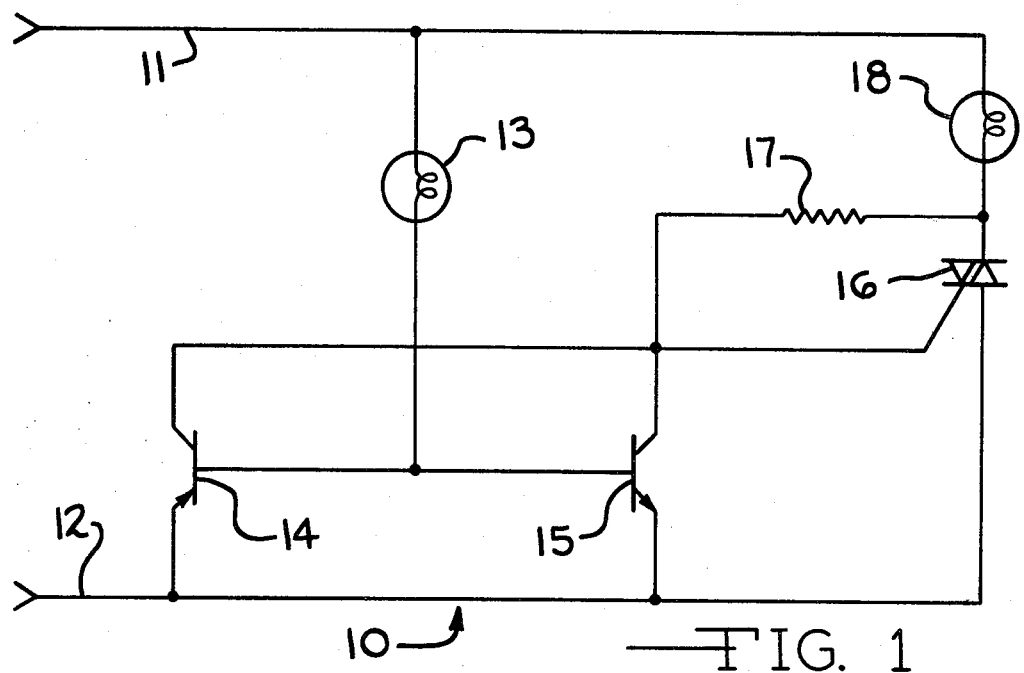
FIG. 1 is a schematic circuit diagram of a lamp substitution circuit constructed in accordance with the present invention.

Turning now to the drawings and particularly to FIG. 1, an improved lamp substitution circuit 10 is shown embodying the principles of the present invention. The circuit 10 is operated from two power terminals: a terminal 11 which may be connected through a vehicle chassis to the common or ground terminal of a vehicle battery and a terminal 12 which is connected to the "hot" or ungrounded battery terminal. The terminal 12 may be connected either to a positive or a negative power source, depending upon the power available in the vehicle. When power is applied between the terminals 11 and 12, a primary incandescent lamp 13 is energized. The lamp 13 is connected between the power terminal 11 and a common connection between the bases of parallel PNP and NPN transistors 14 and 15, respectively. The emitters of the transistors 14 and 15 are connected in common to the power terminal 12. Consequently, when power is applied between the terminals 11 and 12, current flows through the lamp 13 and through the base to emitter junctions of one of the two transistors 14 and 15, depending upon the polarity of the voltage applied between the terminals 11 and 12. Thus, if the terminal 11 is positive with respect to the terminal 12, the NPN transistor 15 will conduct to allow current to flow through the lamp 13. Or, if the terminal 11 is negative with respect to the terminal 12, the PNP transistor 14 will conduct to allow current to flow through the lamp 13.

So long as current flows through the base to emitter junctions of one of the two transistors 14 or 15, current also will flow through the collector to emitter junctions of the same one of the transistors 14 or 15. The collectors of the two transistors 15 are connected in common to the gate of a triac 16 and also through a resistor 17 to either a junction between one of the main terminals of the triac 16 and one terminal of a standby incandescent lamp 18, as shown, or directly to the terminal 11. The other terminal on the lamp 18 is connected to the power terminal 11 and the other main terminal of the triac 16 is connected to the power terminal 12. So long as one of the transistors 14 or 15 conducts, the collector of such conducting transistor is maintained at substantially the potential on the terminal 12 and the triac 16 does not conduct.

In the event that the primary incandescent lamp 13 fails, current flow to the base of the previously conducting transistor 14 or 15 is interrupted. This in turn interrupts current flow between the collector and the emitter of such previously conducting transistor 14 or 15. When the collector current is interrupted, the gate of the triac 16 is no longer connected to the potential on the power terminal 12 and at this point the triac gate is connected only through the resistor 17 and the lamp 18 to the power terminal 11. The resulting gate voltage change triggers the triac 16 into a conducting state to energize the lamp 18. The conducting triac 16 has a resistance much smaller than the resistor 17. Also, by connecting one end of the resistor 17 to the junction between a main terminal of the triac 16 and the lamp 18, the gate voltage drops when the triac 16 is triggered and a voltage drop occurs across the lamp 18. Consequently, substantially all of the current through the lamp 18 will pass between the main terminals of the triac 16. The triac 16 will continue to conduct after triggering, even when the gate voltage is removed. The lamp 18 will remain energized as long as power is applied to the terminals 11 and 12, even though vibrations may cause the broken ends of the filament in the lamps 13 to intermittently contact and illuminate the lamp 13.

The lamp substitution circuit 10 is inherently protected against transient voltage surges. The gate of the triac 16 protects the collectors of the transistors 14 and 15 because the path between the triac gate and the main triac terminal connected to the power terminal 12 inherently cannot pass more than 2 to 3 volts. The base to emitter junctions of the transistors 14 and 15 limit the voltage difference across them to approximately 7 volts and, therefore, the transistors 14 and 15 protect each other against excessive base to emitter voltage. Finally, the resistor 17 limits the voltage across the triac 16, thereby protecting the triac 16 from transients. Since the circuit 10 is inherently protected against transient voltage surges, no additional transient protection devices need to added to the circuit 10 and, therefore, the cost of the circuit 10 is kept to a minimum.

The lamp subtitution circuit 10 may be used in various applications. For example, the circuit 10 is ideal for use in marker lamps used to outline the perimeter of the body of a semitrailer. In such an application, the lamps 13 and 18 may be either two separate lamps within the marker lamp fixture or they may comprise two separate filaments within a single lamp bulb. Or, the lamp 13 may comprise any other lamp normally found within a vehicle. The substitute lamp 18 may comprise a second filament within the same lamp bulb as the lamp 13 or it may comprise a totally independent second lamp. Furthermore, the substitute lamp 18 may be located either adjacent to or remote from the lamp 13. The lamp 18, for example, may comprise an annunerator lamp located on the vehicle dash to alert the driver that a primary lamp 13, such as a brake light, has failed. It also should be appreciated that the lamp 18 may be replaced with other types of loads, such as an audible alarm which is energized upon failure of a primary load 13.

Figure 2:
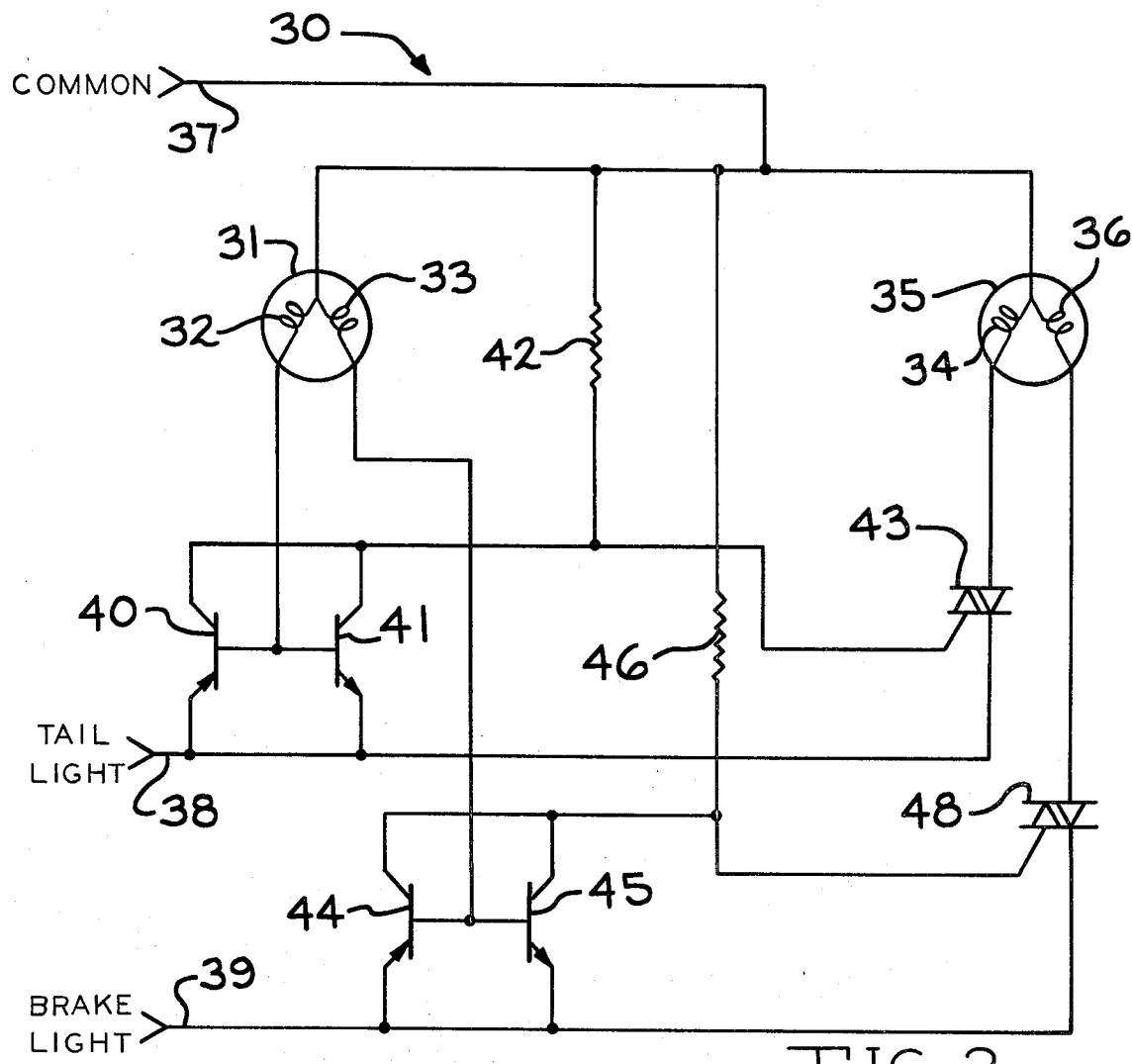
FIG. 2 is a schematic circuit diagram of a modified embodiment of a lamp substitution circuit in accordance with the present invention.

Turning now to FIG. 2, a modified lamp substitution circuit 30 is illustrated. The circuit 30 independently monitors the operation of both filaments in a dual filament lamp 31 which is connected as the tail light and the brake light for a vehicle. The lamp 31 includes a tail light filament 32 and a brake light filament 33 mounted within a single lamp bulb. Upon failure of the tail light filament 32, the circuit 30 energizes a corresponding filament 34 in a dual filament substitute lamp 35. Similarly, upon failure of the brake light filament 33, the circuit 30 energizes a filament 36 within the substitute lamp 35.

A common terminal 37 is connected to the grounded or common terminal on the vehicle battery (not shown). When a conventional vehicle light switch (not shown) is actuated to turn on the tail lights, power is applied from the ungrounded battery terminal through such switch to a tail light power terminal 38. Similarly, when the vehicle brakes are applied, a conventional vehicle brake light switch (not shown) applies power from the battery to a brake light terminal 39 within the circuit 30. The tail light filament 32 within the lamp 31 is connected between the common terminal 37 and the common bases of parallel connected PNP and NPN transistors 40 and 41, respectively. Depending upon the polarity of the voltage applied between the terminals 37 and 38, current will flow through the tail light filament 32 and the base to emitter junctions of one of the transistors 40 or 41. At the same time, current will flow from the terminal 37 through a resistor 42 and the collector to emitter junctions of the conducting one of the transistors 40 or 41. If desired, the end of the resistor 42 shown connected to the terminal 37 can be connected to between the filament 32 and the triac 34 so that this current will also flow through the filament 32. This arrangement reduces the gate current in the triac 43 once the triac 43 has fired and also eliminates the triac gate current if both filaments 32 and 34 should fail. So long as one of the transistors 40 or 41 conducts, the common collectors of the transistors 40 and 41 will be maintained at substantially the potential appearing on the terminal 38. In the event that the tail light filament 32 fails, neither of the transistors 40 or 41 will conduct and the collector to emitter current through the previously conducting one of the transistors 40 or 41 will be interrupted. At this time, the resistor 42 raises the voltage appearing on the common collectors of the transistors 40 and 41 to substantially the potential of the common terminal 37. The potential appearing on the collectors of the transistors 40 and 41 also is applied to the gate of the triac 43 which has main terminals connected in series between the substitute tail light filament 34 and the power terminals 37 and 38. When the previously conducting one of the transistors 40 or 41 ceases to conduct due to a failure of the tail light filament 32, the rise in voltage applied to the gate of the triac 43 triggers the triac 43 to energize the substitute tail light filament 34.

A similar circuit arrangement is provided for energizing the substitute brake light filament 36 in the event of a failure of the primary brake light filament 33. The filament 33 is connected between the common terminal 37 and the common bases of parallel PNP and NPN transistors 44 and 45, respectfully. The emitters of the transistors 44 and 45 are connected to the terminal 39 for connection to the battery (not shown) whenever the vehicle brakes are actuated. Thus, actuation of the vehicle brakes causes current to flow through the brake light filament 33 and the base to emitter junctions of one of the transistors 44 or 45, depending upon the battery polarity. At the same time, current flows from the terminal 37 through a resistor 46 and the collector to emitter junctions of the conducting one of the transistors 44 or 45 to the terminal 39. If desired, the end of the resistor 46 shown connected to the terminal 37 can be connected to between the lamp filament 36 and the triac 48. In the event that the brake light filament 33 fails, the collector to emitter current in the previously conducting one of the transistors 44 or 45 is interrupted and the resistor 46 applies voltage from the terminal 37 to the gate of a triac 48. This voltage is sufficient to trigger the triac 48 into conduction to connect the substitute brake light filament 36 between the terminals 37 and 39. Thus, the circuit 30 illustrates the use of two of the circuits 10 shown in FIG. 1 to provide automatic redundancy in a four filament system.

The circuit 30 illustrates two bulbs 31 and 35, each of which has two filaments with the filaments in the bulb 31 serving as primary filaments and the filaments in the bulb 35 serving as secondary or substitute filaments in the event of failure of a corresponding filament in the bulb 31. Of course, the filaments 32, 33, 34 and 36 may be in four separate lamps or any two of the filaments may be in the same lamp.

It will be appreciated that various changes and modifications may be made in the above described preferred embodiments of the invention and that the basic load substitution circuit 10 illustrated in FIG. 1 may be used in various applications without departing from the spirit and the scope of the following claims.

What I claim is:

1. A dual polarity alarm circuit for applying power from two power terminals to a second load in response to failure of a first load comprising a PNP transistor and an NPN transistor each having a base, an emitter and a collector, means connecting said emitters to one of said power terminals, means connecting said first load between the other of said power terminals and said bases of said transistors whereby current normally flows through said first load and the base to emitter junctions of one of said transistors, a bidirectional switch having main terminals and gate means for triggering said switch into conduction, means connecting said switch main terminals and said second load in series between said power terminals, means connecting said gate means to said transistor collectors, and resistor means connected between said gate means and said other power terminal for causing said gate means to trigger said switch when a conducting one of said transistors ceases to conduct due to failure of said first load whereby said second load is energized.

2. A dual polarity alarm circuit, as set forth in claim 1, wherein said resistor means includes said second load.

3. A dual polarity alarm circuit, as set forth in claim 2, wherein said bidirectional switch is a triac.

4. A dual polarity alarm circuit, as set forth in claim 1, wherein said bidirectional switch is a triac.

5. A dual polarity circuit for energizing a substitute lamp from two terminals of a vehicle battery system upon failure of a primary lamp connected to the battery system comprising parallel connected PNP and NPN transistors having common bases, common emitters and common collectors, means connecting said emitters to one of the battery system terminals, means connecting said primary lamp between the other battery system terminal and said bases whereby battery system current normally flows through said primary lamp and the base to emitter junctions of a conducting one of said transistors, a bidirectional switch having main terminals and gate means for triggering said switch into conduction in response to a trigger voltage, means connecting said switch main terminals and said substitute lamp in series between the battery system terminals, and resistor means connecting said gate means and said collectors to the other battery system terminal for applying a trigger voltage to said gate means when a conducting one of said transistors ceases to conduct due to failure of said primary lamp whereby said switch is triggered to energize said substitute lamp.

6. A dual polarity circuit, as set forth in claim 5, wherein said bidirectional switch is a triac.

7. A dual polarity circuit, as set forth in claim 5, wherein said resistor means includes said substitute lamp.

* * * * *